US012534929B2

(12) United States Patent
Bruneel et al.

(10) Patent No.: US 12,534,929 B2
(45) Date of Patent: Jan. 27, 2026

(54) AUTONOMOUS IMPELLER VACUUM CLEANER FOR CLEANING SWIMMING POOLS

(71) Applicant: KOKIDO DEVELOPMENT LIMITED, Kowloon (HK)

(72) Inventors: Jean Bruneel, Kowloon (HK); Max Roumagnac, Martignas sur Jalle (FR)

(73) Assignee: KOKIDO DEVELOPMENT LIMITED, Kowloon (HK)

( * ) Notice: Subject to any disclaimer, the term of this patent is extended or adjusted under 35 U.S.C. 154(b) by 296 days.

(21) Appl. No.: 17/990,704

(22) Filed: Nov. 20, 2022

(65) Prior Publication Data

US 2023/0160227 A1 May 25, 2023

(30) Foreign Application Priority Data

Nov. 23, 2021 (EP) ..................................... 21210075

(51) Int. Cl.
*E04H 4/16* (2006.01)
*B01D 27/04* (2006.01)
*B01D 35/31* (2006.01)

(52) U.S. Cl.
CPC ........... *E04H 4/1636* (2013.01); *B01D 27/04* (2013.01); *B01D 35/31* (2013.01)

(58) Field of Classification Search
CPC ....... E04H 4/16; E04H 4/1654; B01D 29/117; A47L 9/22
See application file for complete search history.

(56) References Cited

U.S. PATENT DOCUMENTS

| | | | | |
|---|---|---|---|---|
| 3,755,843 | A * | 9/1973 | Goertzen, III | ........ E04H 4/1618 15/350 |
| 5,588,177 | A * | 12/1996 | Eriksen | ..................... A47L 5/36 15/327.5 |
| 5,768,734 | A | 6/1998 | Dietrich | |
| 6,311,366 | B1 * | 11/2001 | Sepke | ........................ A47L 5/30 15/352 |
| 6,442,792 | B1 * | 9/2002 | Sudou | ....................... A47L 5/28 15/352 |
| 6,596,044 | B1 * | 7/2003 | Bilek | .................... B01D 50/20 55/482 |
| 8,281,441 | B1 * | 10/2012 | Erlich | ................... E04H 4/1618 15/1.7 |
| 10,094,130 | B2 | 10/2018 | Erlich et al. | |
| 2016/0273238 | A1 | 9/2016 | Heffernan | |
| 2016/0326761 | A1 * | 11/2016 | Bruneel | ............... B01D 29/117 |
| 2020/0061502 | A1 * | 2/2020 | Erlich | .................... B01D 29/15 |
| 2020/0353390 | A1 * | 11/2020 | Roumagnac | ........... B01D 39/08 |
| 2021/0164252 | A1 | 6/2021 | Bruneel et al. | |

FOREIGN PATENT DOCUMENTS

| | | | |
|---|---|---|---|
| EP | 3832053 A1 | 6/2021 | |
| FR | 3080879 A1 | 11/2019 | |
| FR | 3095827 A1 | 11/2020 | |

* cited by examiner

*Primary Examiner* — Michael D Jennings
(74) *Attorney, Agent, or Firm* — H&I PARTNERS; Chai Im; C. Andrew Im

(57) ABSTRACT

A submersible vacuum cleaner to clean artificial pools, such as swimming pools. A suction head connected to a suction duct leading into a filter bag. A motor coupled to an impeller located within the suction duct. The spinning of the impeller producing a suction. A battery powering the motor. The motor and the battery being placed in a watertight compartment, itself mostly placed within the filter bag, so as to obtain a compact design of the vacuum cleaner.

3 Claims, 6 Drawing Sheets

AUTONOMOUS IMPELLER VACUUM CLEANER FOR CLEANING SWIMMING POOLS

RELATED APPLICATIONS

This application claims priority from European Patent Application No. 21210075.4 filed Nov. 23, 2021, which is incorporated herein by reference in its entirety.

TECHNICAL FIELD

The present invention belongs to the field of swimming pool maintenance devices and similar, particularly submersible vacuum cleaner robots and brushes, and more particularly relates to an autonomous impeller vacuum cleaner, having a small size adapted to shallow pools.

BACKGROUND OF THE INVENTION

To properly maintain swimming pools and remove the debris that accumulates at their bottoms, there are several types of impeller vacuum cleaners powered by a battery and provided with a filter bag. Such so-called autonomous, vacuum cleaners are for example described in the documents U.S. Pat. No. 5,768,734 (Dietrich) and US 2016/0273238 (Heffernan). Others also, developed by the present inventors, are described in the documents FR 3 080 879 (Kokido) and EP 3 832 053 (Kokido).

According to the models, the battery is either integrated within the vacuum cleaner, in which case it is intended to be immersed in the water of the swimming pool, or separate from the vacuum cleaner and placed outside of the swimming pool by being connected to the latter by electrical connection cables.

These vacuum cleaners also distinguish from one another by the position of the impeller in relation to the suction duct.

Generally, the motor and the impeller are positioned entirely within the suction duct. This requires an impeller diameter larger than that of the engine block in order to ensure an efficient bypass suction, and in fine significant dimensions of the suction duct receiving the impeller.

The document U.S. Pat. No. 10,094,130 (Water Tech) presents a solution wherein the motor is attached outside of the suction duct and the impeller, of large diameter, is placed straddling over the outlet of said duct to prevent leaves from accumulating under the impeller during the suction. However, the fact that the impeller is partially outside of the suction duct implies a reduction of the suction efficiency due to an absence of channeling of the eddy created in the filter bag outside of the duct.

The accumulation of leaves and other bulky debris under the impeller may be prevented by other alternative and more effective solutions. For example, the document EP 3 832 053 (Kokido) proposes a solution wherein a central deflector is placed between the motor and the impeller so as to prevent bulky debris from piling up below said impeller by discharging it towards the periphery of the suction duct.

The accumulation of bulky debris under the impeller of course remains a major problem, above all when this concerns small vacuum cleaners, but less critical than the risks related to electrical cables in contact with the water in the known solutions, and this despite the water-resistance of the connections because they are not entirely isolated from the water.

OBJECT AND SUMMARY OF THE INVENTION

The aim of the present invention is to overcome the drawbacks of the prior art disclosed above and propose a design making it possible to reduce the diameter of the suction duct and eliminate the risks related to a lack of watertightness of the connection between the motor and the battery.

To this end, the object of the present invention is a submersible vacuum cleaner for cleaning artificial pools such as swimming pools, comprising a suction head connected to a suction duct leading into a filter element, a motor coupled to an impeller located within the suction duct, the spinning of which produces the suction, and a battery powering the motor, that may be in the form of disposable accumulators, wherein the motor and the battery are placed in a watertight compartment, itself mostly placed within the filter element.

According to one embodiment, the watertight compartment is attached to a support that holds it suspended above the suction duct.

More particularly, the support includes a cover, closing the watertight compartment and receiving a connector for charging the battery, and at least one arm extending from the cover to the suction duct to be attached thereto, by being remote from the watertight compartment so as not to obstruct the passage of the bulkiest debris.

According to one advantageous embodiment, the vacuum cleaner further includes a central deflector placed between the impeller and the watertight compartment to prevent the accumulation of bulky debris at this location.

The filter element may comprise a flexible bag or a pleated cartridge.

According to advantageous embodiments, the vacuum cleaner has a length between 10 and 40 cm and its suction duct has a diameter between 40 and 200 mm. The fundamental concepts of the invention having just been disclosed above in their most elementary form, other details and features will become more clearly apparent upon reading the following description and with regard to the appended drawings, giving by way of nonlimiting example an embodiment of an autonomous impeller vacuum cleaner in accordance with the principles of the invention.

BRIEF DESCRIPTION OF THE FIGURES

The figures are given purely by way of illustration for a better understanding of the invention without limiting its scope. The various elements may be shown schematically and are not necessarily to the same scale. In all of the figures, identical or equivalent elements bear the same numerical reference.

It is thus illustrated in.

DETAILED DESCRIPTION OF EMBODIMENTS

It should be noted that certain technical elements well known to the person skilled in the art are described here to avoid any inadequacy or ambiguity in the understanding of the present invention.

In the embodiment described below, reference is made to an autonomous impeller vacuum cleaner, mainly intended for cleaning swimming pools. This example, nonlimiting, is given for a better understanding of the invention and does not exclude the use of the vacuum cleaner in other shallow pools such as jacuzzis, muscular recovery by immersion pools (cryotherapy), fountains, etc.

In the present description, the term "vacuum cleaner" designates a submersible vacuum cleaner brush for cleaning the bottom of pools, and the expression "autonomous vacuum cleaner" designates a vacuum cleaner the power supply of which is ensured by a battery.

Figure 1:
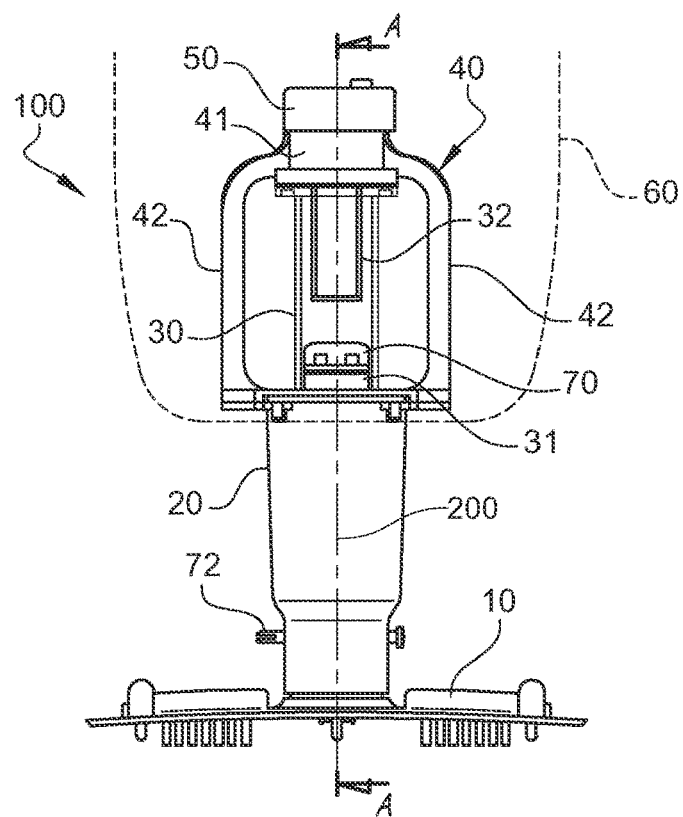
FIG. 1: a front view of a vacuum cleaner according to a first embodiment of the invention.
Figure 2:
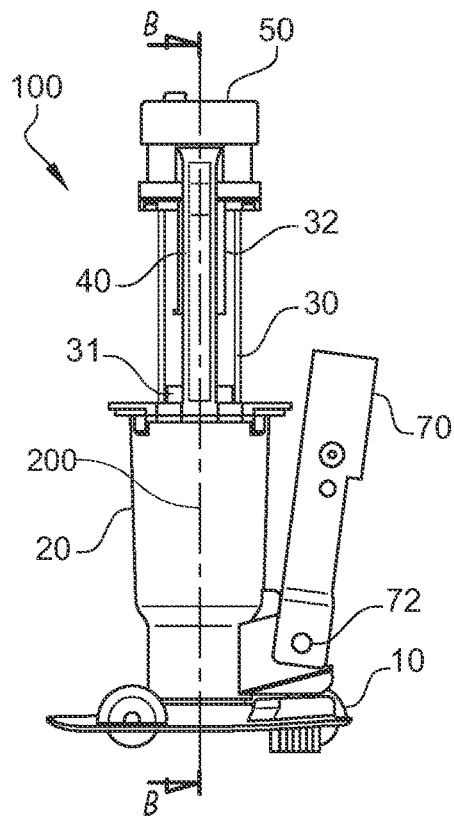
FIG. 2: a side view of the vacuum cleaner.
Figure 3:
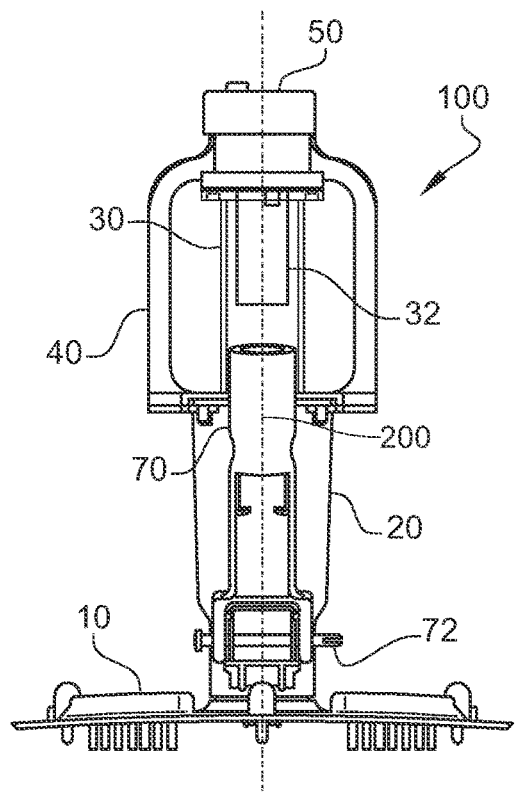
FIG. 3: a rear view of the vacuum cleaner.

FIGS. 1 to 3 show, according to various views, a vacuum cleaner 100 comprising a suction head 10 connected to a suction duct 20, a watertight compartment 30 enclosing a motor 31 and a battery 32, a support 40 attached to the suction duct 20 and holding the watertight compartment 30 suspended above said duct, an electrical switch 50 rotatably mounted on the support 40, a filter bag 60 shown partially and schematically in FIG. 1, and a sleeve 70 hinged on the duct 20 and intended to receive a removable handle for gripping the vacuum cleaner 100.

The vacuum cleaner 100 thus has a compact design extending along a longitudinal axis 300, wherein the motor and the battery, as well as their electrical connections, are placed in a watertight compartment, itself placed, totally or partially within the filter bag.

The watertight compartment 30, according to the illustrated example, has a substantially cylindrical shape and dimensions adapted to receive the motor 31 and the battery 32.

Figure 6A:
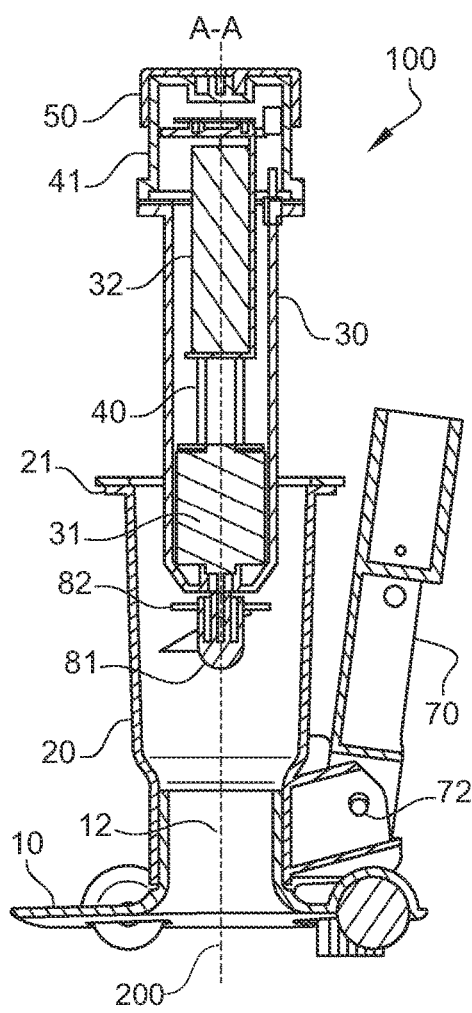
FIG. 6a: a sectional view of the vacuum cleaner along the plane A-A of FIG. 1.
Figure 6B:
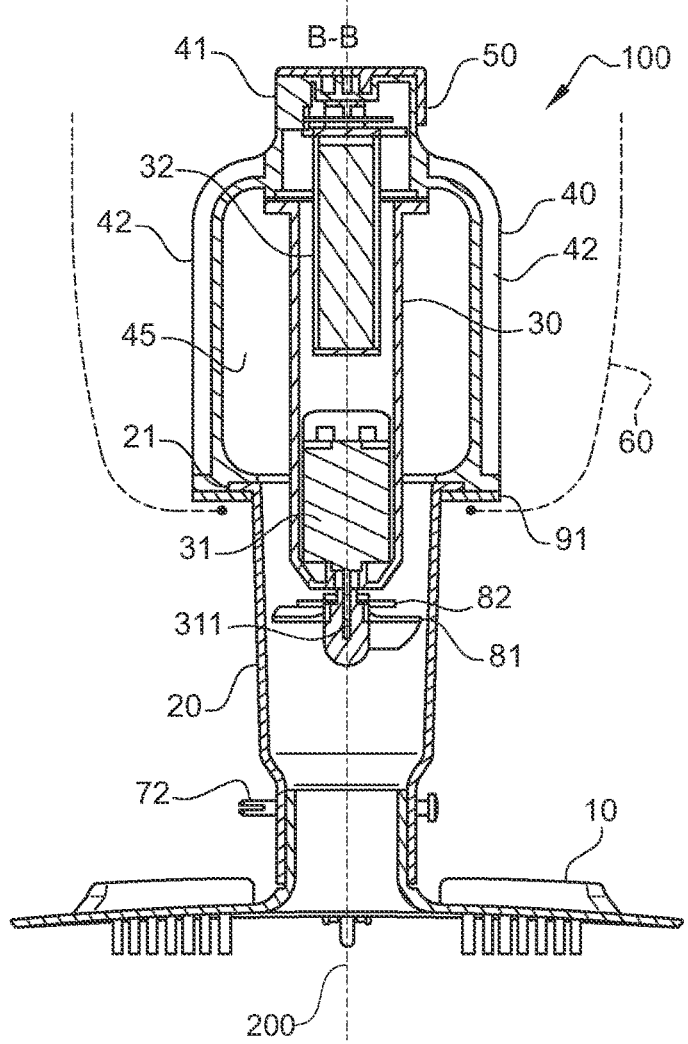
FIG. 6b: a sectional view of the vacuum cleaner along the plane B-B of FIG. 2.

FIGS. 6a and 6b show a possible layout of the watertight compartment 30 within the vacuum cleaner 100 as well as the arrangement of the motor 31 and of the battery 32 within said compartment.

The motor 31 is placed in a lower portion of the watertight compartment 31, with a shaft 311 oriented downward to make a coupling with an impeller 81 positioned within the suction duct 20 possible. Indeed, the motor 31 is fitted at the bottom of the watertight compartment 30, the latter being provided with a hole to make it possible to pass the shaft 311 through in a watertight manner. The shaft 311 thus extends outside of the watertight compartment 30 along a sufficient length to make the coupling of the impeller 81 possible.

In the illustrated example, the impeller 81 is positioned fairly low in relation to an outlet 21 of the suction duct 20, slightly in the middle of said duct. However, it is preferable that the impeller 82 is flush with the upper edge 21 of the suction duct 20, corresponding to its outlet leading into the filter bag 60, while remaining entirely within said duct. This makes it possible to discharge this debris more easily towards the bag 60 and thus prevent an accumulation of bulky debris in the narrow interstice between the watertight compartment 30 and the inner walls of the suction duct 20, as opposed to the configuration of FIGS. 6a and 6b wherein said compartment is partially placed within said duct.

Nevertheless, the configuration of FIGS. 6a and 6b remains acceptable insofar as most of the watertight compartment 30 is outside of the suction duct 20.

The battery 32, according to the illustrated example, is for its part positioned in an upper portion of the watertight compartment 30 and connected to the motor 31 by electrical cables not shown. The cables are thus entirely housed in the watertight compartment 30 and, thereby, isolated from the water of the swimming pool during the use of the vacuum cleaner 100 for greater safety.

The battery 32 is rechargeable and has an adapted connector located at a cover 41 of the support 40, whereon the switch 50 is mounted. This cover 41 may further contain other electronic components necessary for operating the switch 50, the battery 32 and the motor 31.

According to the illustrated example, the battery 32 is attached directly to the cover 41 of the support 40, said cover closing the watertight compartment 30 by a connection through a watertight attachment flange to totally isolate from the water the motor 31, the battery 32 as well as other electronic elements of the vacuum cleaner.

Thus, the watertight compartment 30, closed by the cover 41 of the support 40, defines a volume isolated from the water and suspended within the filter bag 60 and above the suction duct 20, without obstructing the suction of debris.

This suspension of the watertight compartment 30 is ensured by the support 40 which, to this end, comprises two spread apart arms 42 extending to the suction duct 20, parallel to the longitudinal axis 200 of the vacuum cleaner.

In addition, each arm 42 is remote from the watertight compartment 30 thus leaving a space 45 so as to avoid obstructing the suction of debris towards the filter bag 60, in particular for the bulkiest debris.

This particular design of the support 40 indeed makes it possible to free as much as possible the passage of debris of the suction duct 20 of the filter bag 60, while ensuring a sufficient mechanical strength in view of the stresses that the vacuum cleaner is intended to be subjected during operation.

In order to further clear the passage of debris, the support 40 may, in an alternative design, include only one arm. Nevertheless, considering a favorable advantage/drawback ratio, the design with two arms remains preferable.

The support 40 may be attached to the suction duct 20 by any suitable means.

Figure 7:
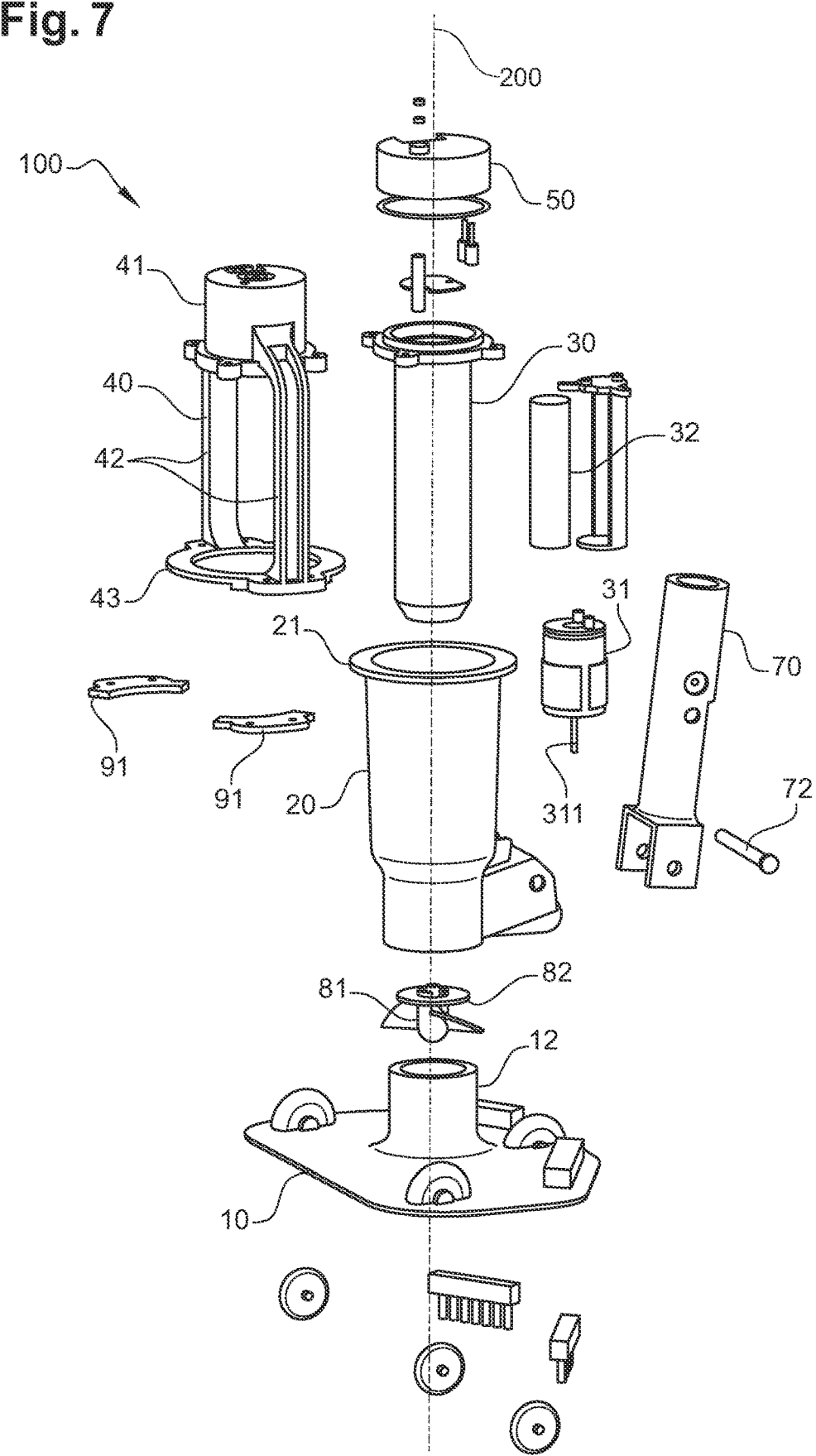
FIG. 7: an exploded view of the vacuum cleaner.
Figure 8:
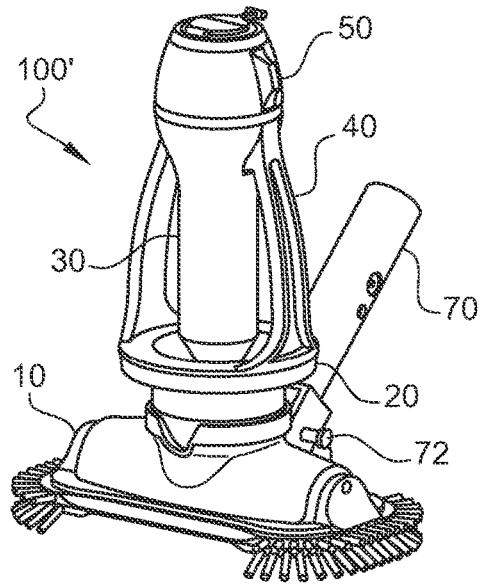
FIG. 8: a front perspective view of a vacuum cleaner according to a second embodiment of the invention.
Figure 9:
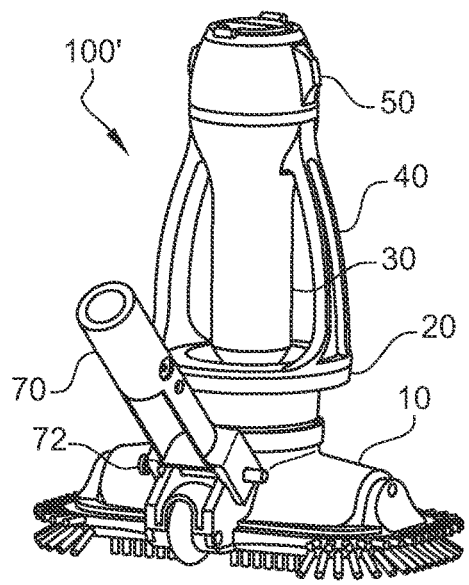
FIG. 9: a rear perspective view of the vacuum cleaner.
Figure 10:
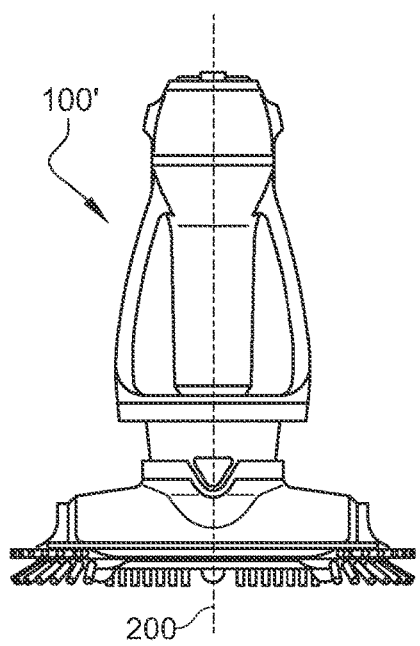
FIG. 10: a front view of the vacuum cleaner.
Figure 11:
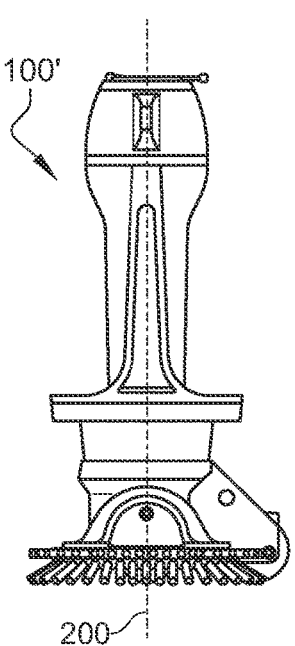
FIG. 11: a side view of the vacuum cleaner.
Figure 12:
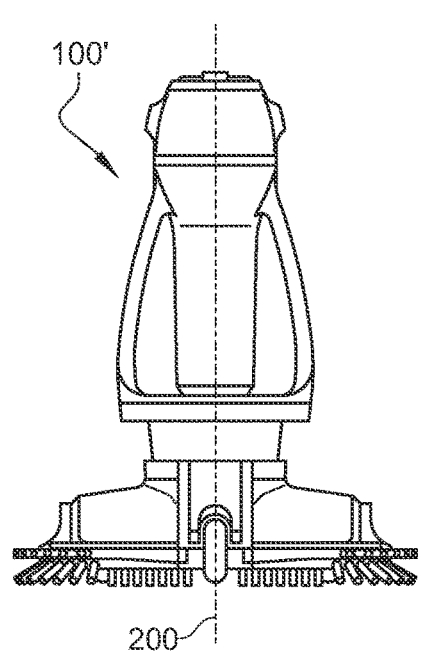
FIG. 12: a rear view of the vacuum cleaner.
Figure 13:
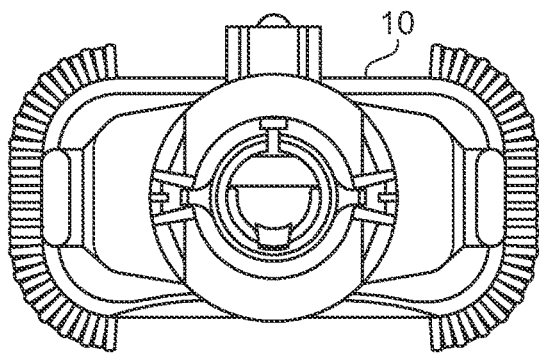
FIG. 13: a top view of the vacuum cleaner.
Figure 14:
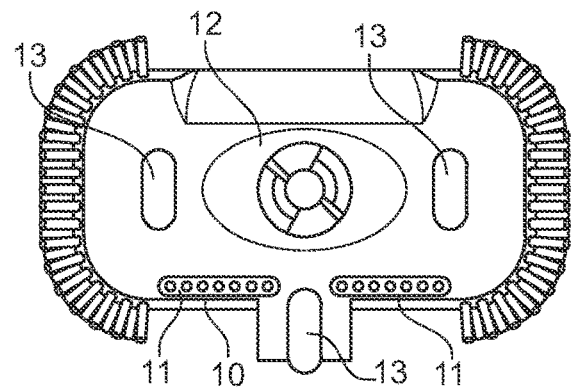
FIG. 14: a bottom view of the vacuum cleaner.
Figure 15:
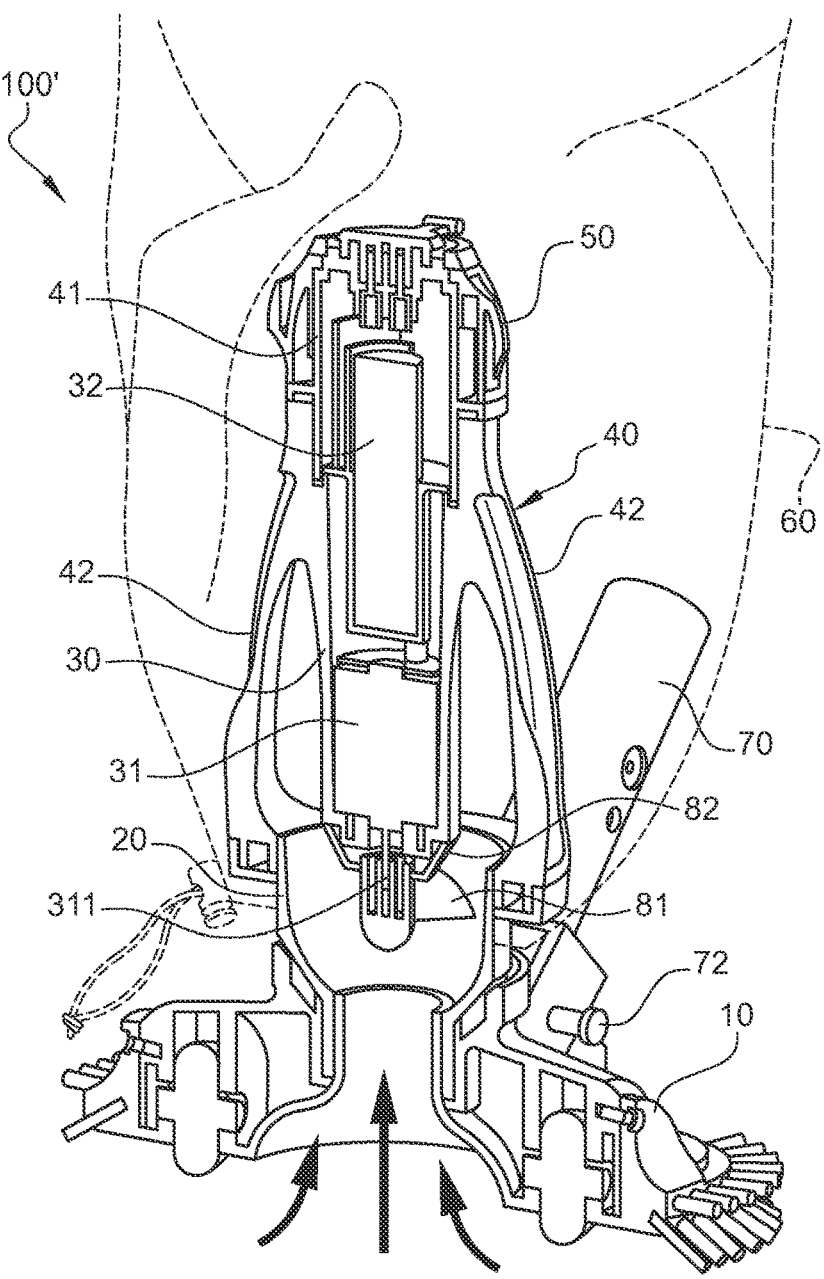
FIG. 15: a perspective sectional view of the vacuum cleaner.
Figure 16:
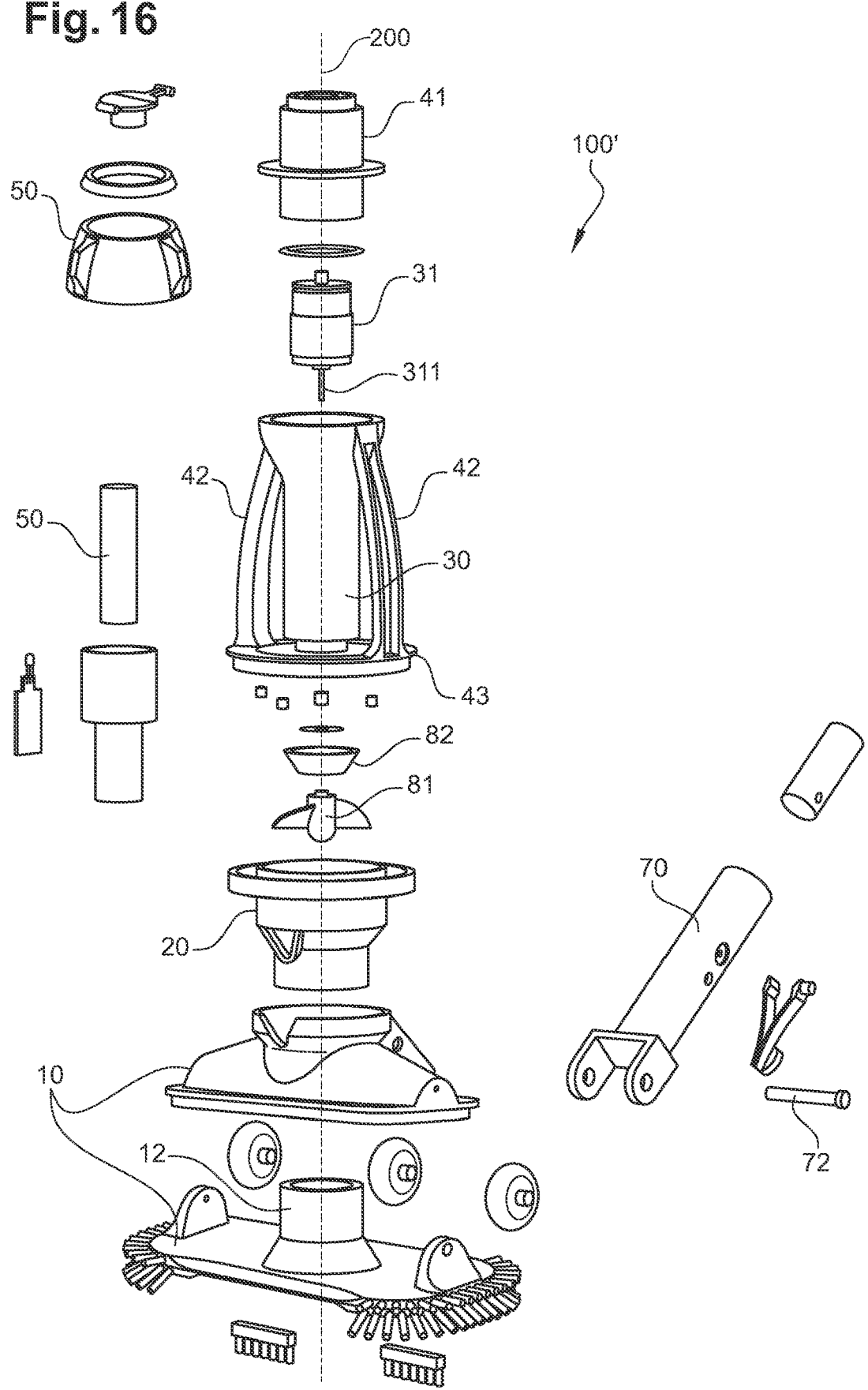
FIG. 16: an exploded view of the vacuum cleaner.

FIG. 7 shows the vacuum cleaner 100 in exploded view and thus makes it possible to better understand the arrangement of its various elements, particularly the attachment of the support 40 on the suction duct 20 by means of an annular base 43 of said support that comes to rest on the flat annular edge 21 of said duct. Plates 91 are provided to come to tighten, at the lower ends of the arms 42, the annular edge 21 against the annular base 43 of larger diameter.

Of course, the operation of the rest of the vacuum cleaner 100 is known, particularly as regards the suction head 10 that, acting as cleaning interface intended to come into contact with the surfaces whereon debris is stored, may be equipped with any member adapted to this end and facilitating the cleaning operation such as brushes and scrapers, but also any movement means such as wheels or rollers. In addition, the suction head may have various shapes (circular, triangular, etc.) and include one or more suction nozzles.

Figure 4:
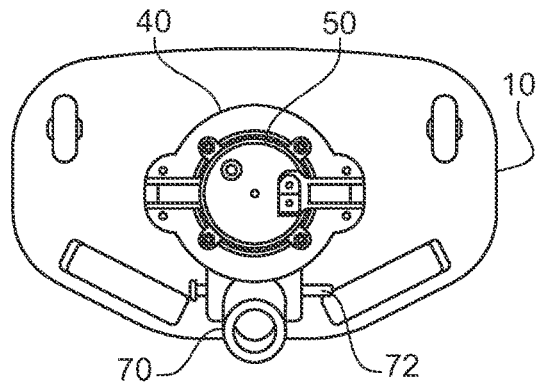
FIG. 4: a top view of the vacuum cleaner.
Figure 5:
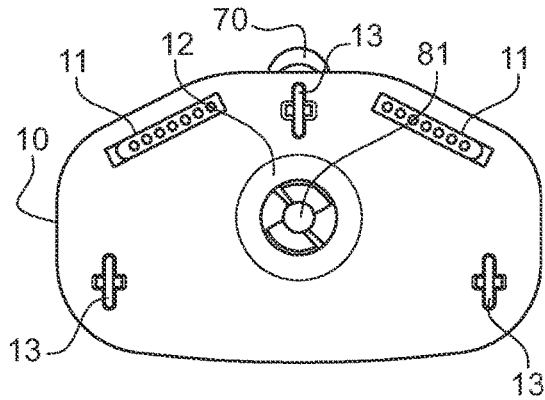
FIG. 5: a bottom view of the vacuum cleaner.

FIGS. 4 and 5 make it possible to clearly display the shape of the suction head 10 according to the illustrated example, the latter has a rectangular shape at the front, substantially rounded at the apices, and trapezoidal at the rear, so that the inclined sides of the trapezium make possible a converging layout of two brushes 11 to bring the debris back to a suction nozzle 12 during the forward motion of the vacuum cleaner.

In this same example, the suction head 10 rests on three wheels 13 arranged in a triangle.

On another side, the sleeve 70 is hinged on the suction duct 20 about a transverse axis 72 perpendicular to the longitudinal axis 200 of the vacuum cleaner 100.

Finally, thanks to this design, the vacuum cleaner 100 has a small size with particularly a length between 10 and 40 cm, preferably approximately 30 cm, and a suction duct 20 of variable diameter between 40 and 200 mm approximately.

It becomes clearly apparent from the present description that certain elements of the autonomous impeller vacuum cleaner may be modified, replaced or eliminated, without in as much departing from the scope of the invention.

FIGS. 8 to 16 show for example a vacuum cleaner 100' according to another embodiment of the invention, wherein certain secondary elements are modified, particularly the overall shape of the vacuum cleaner.

The invention claimed is:

1. A submersible vacuum cleaner to clean a pool, comprising along a height of a longitudinal axis from bottom to top:
   a suction head;
   a suction duct connected to the suction head and comprising an impeller;
   a filter element;
   a motor coupled to the impeller to spin the impeller so as to produce a suction;
   a battery powering the motor;
   wherein the motor and the battery are comprised in a watertight compartment located, at least partly, within the filter element;
   wherein the watertight compartment is attached to a support that holds the watertight compartment suspended above the suction duct; and
   wherein the support comprises a cover configured to close the watertight compartment, a connector to charge the battery, and at least one arm extending from the cover to the suction duct, said at least one arm being attached to the suction duct and remote from the watertight compartment.

2. The submersible vacuum cleaner of claim 1, wherein the filter element comprises a flexible bag.

3. The submersible vacuum cleaner of claim 1 having a length, measured along the longitudinal axis, between 10 cm and 40 cm; and wherein the suction duct has a diameter between 40 mm and 200 mm.

* * * * *